United States Patent [19]

Shiguma et al.

[11] 4,215,558
[45] Aug. 5, 1980

[54] PROCESS OF MANUFACTURING A TAPER LEAF SPRING AND ITS DEVICE

[75] Inventors: Heijiro Shiguma; Jun Takahashi; Yoshihiro Sakai; Akira Ohno, all of Yokohama, Japan

[73] Assignee: NHK Spring Co., Ltd., Yokohama, Japan

[21] Appl. No.: 95

[22] Filed: Jan. 2, 1979

[30] Foreign Application Priority Data

Dec. 30, 1977 [JP] Japan ................... 52/159784

[51] Int. Cl.² .................................. B21B 37/00
[52] U.S. Cl. .................................. 72/9; 72/240; 72/16
[58] Field of Search ............... 72/9, 12, 16, 17, 187, 72/240, 8; 29/173

[56] References Cited

U.S. PATENT DOCUMENTS

| | | | |
|---|---|---|---|
| 2,687,052 | 8/1954 | Zeitlin | 72/9 |
| 3,081,653 | 3/1963 | Kincaid | 72/8 |
| 3,422,656 | 1/1969 | Orr et al. | 72/199 X |
| 3,793,868 | 2/1974 | Wilson | 72/240 X |

Primary Examiner—Milton S. Mehr
Attorney, Agent, or Firm—Fleit & Jacobson

[57] ABSTRACT

A process of manufacturing a taper leaf spring by which rollers for measuring the length and the thickness are respectively disposed on the take-out side of a material plate for a taper leaf spring relative to a pair of rolling rollers, and also rollers for measuring the breadth are disposed on the same take-out side; rolling for regulating the breadth is beforehand performed by a pair of edge rollers on the take-in side of the material plate relative to the pair of rolling rollers; the distance of the interval between both rolling rollers is adjusted by comparing signals coming from the rollers for measuring the length and the thickness with the standard signals based on the predetermined specifications of the length and the thickness; the regulation of the breadth by means of the pair of edge rollers is controlled by comparing the signal from the breadth measuring rollers with the standard signal based on the predetermined specification; so that the material plate is rolled to a taper as desired.

4 Claims, 21 Drawing Figures

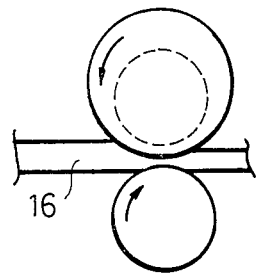
FIG. 1a
PRIOR ART
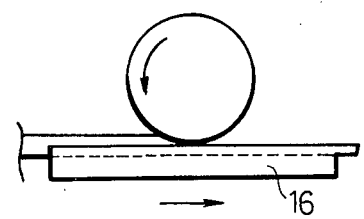
FIG. 1b
PRIOR ART
FIG. 2
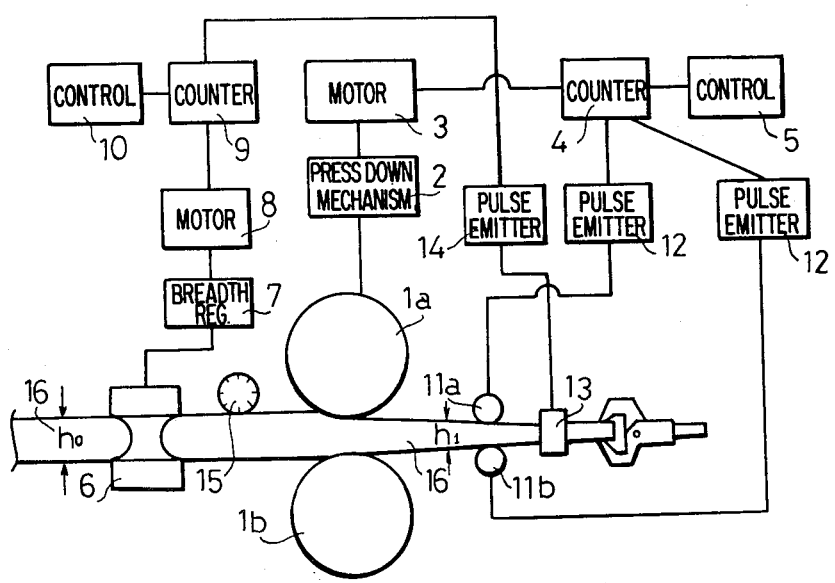

PROCESS OF MANUFACTURING A TAPER LEAF SPRING AND ITS DEVICE

BACKGROUND OF THE INVENTION

Field of the Invention

This invention relates to a process of manufacturing a taper leaf spring by applying special rolls on a material plate for a taper leaf spring in order to form a taper toward a terminal of said material plate, and also relates to a device for this process.

According to a conventional process of manufacturing a taper leaf spring, the pressing extent of the rolling rollers is adjusted to get a desired taper considering the thickness of the material plate as basis, so that the taper portion of the plate spreads out at its both lateral sides to have a broader breadth. Therefore, it is further required to carry out such secondary work as cutting and abrading, grinding and abrading, etc. Hence, the work units are increased and the productivity is lowered. For preventing such defects, rolling means as shown in FIG. 1 (a) and (b) are usually employed.

At the rolling means illustrated in FIG. 1 (a), the upper roller is provided with flanges on its both edges so as to be of so-called grooved roller shape and the breadth regulating effect is thus expected.

At the rolling means illustrated in FIG. 1 (b), a rolling stand is used instead of the lower roller and this stand is provided with embankments on its both sides so that the breadth regulating effect is expected.

However, in either of the above two instances, the control of the breadth becomes uncertain when the shape of the flange or the embankment is lost by wear. Hence, problems exist as to the maintenance of precise dimension. Moreover, it is feared that the penetration of metallic scales between the flange portion and the lower roller or between the upper roller and the embankment of the rolling stand may take place to result in breakage or damage accidents.

SUMMARY OF THE INVENTION

The primary objective of this invention consists in that by employing edge rollers along with rolling rollers, the extent of pressing down per one rolling is increased so that the number of rollings can greatly be reduced.

As the second objective of this invention, it is intended by employing edge rollers along with rolling rollers to omit the post-rolling treatment of the rolled portion, i.e., such treatment as cutting and abrading or grinding and abrading for corner rounding and breadth trimming, so as to enhance the productivity.

The fourth objective of this invention is that by regulating the breadth of the material plate by means of the edge rollers, the breadth dimension is made more precise so as to avoid the nonuniformity, dislocation, etc. at the time of assembling and promote the efficiency of operation.

The fifth objective of this invention is that by employing the edge rollers together with the rolling rollers, the descaling effect is enhanced at the time of breadth regulation of the material plate and the quality of finished goods is improved.

The sixth objective of this invention is to prevent the bending, swelling, etc. of the material plate occurring often at the conventional rolling, through the rolling force for breadth regulation applied by the edge rollers to the material plate.

BRIEF DESCRIPTION OF THE DRAWINGS

In the detailed description of the preferred embodiments of the invention presented below, reference is made to the accompanying drawings, in which:

FIGS. 1 (a) and (b) are outline side elevational views of the conventional device;

FIG. 2 is a side view illustrating one embodiment of the present invention;

FIG. 3 (b) is a view taken along line A—A of FIG. 3 (a);

DESCRIPTION OF THE PREFERRED EMBODIMENTS

Figures 3A, 3B:
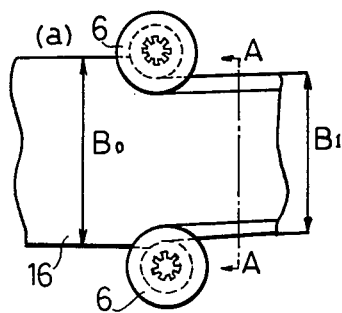
FIG. 3 (a) is a top plan view of the edge rollers working on the material plate.

FIG. 2 through FIG. 8 illustrate the constitutions and functions of the device in order to clarify the process of manufacturing a taper leaf spring according to this invention.

In FIG. 2, marks 1a and 1b designate a pair of rolling rollers, upper one and lower one. The extent of pressing down by the upper roller 1a is adjusted by means of a pressing-down mechanism 2. The lower roller 1b is of fixed type being not adjustable up and down. However, it is conceivable in another embodiment that the lower roller may press upward and work together with the upper roller so as to hold the material plate 16 between both rollers and press it from both up and down.

Said pressing-down mechanism 2 is driven by an oil-pressure motor 3, which is actuated by signals coming from a preset counter 4. Working specifications for the thickness of the plate are transformed to signals by a prescribing apparatus or control 5 and these signals are put in said preset counter 4.

A pair of right and left edge rollers are mounted on the take-in side of the material plate relative to said rolling rollers, and the breadth dimension between both edge rollers is determined by a breadth regulating device 7.

When the material plate is pressed and rolled by the upper roller 1a, the material plate is somewhat biased toward the direction of pressing down. It is necessary to adjust automatically the upper and lower positions of the edge rollers 6 in accordance with this biasing. Hence, the edge rollers 6 are, for instance, movably attached with the spline shaft, so that they can follow the up and down aberrations of the material plate at the time of pressing and rolling.

Figure 4A:
FIGS. 4(a) and (b) are cross sections showing examples of curve shapes of the edge rollers.
Figure 4B:
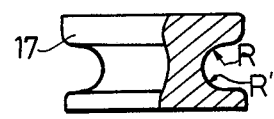

Said breadth regulating device 7 is also provided with mechanism for adjusting the upper and lower positions of the edge rollers. The shape of the concave portion between a pair of flange portions 17 of the edge roller 6 may be simply a semi-circle formed with one radius (R) as shown in FIG. 4 (a), or may have an unevenly curved cross section with the curve on one side having a radius larger than the radius of the curve on the other side as shown in FIG. 4 (b).

Said edge rollers 6 are driven at a fixed speed and the distance between them is adjusted by said breadth regulating device 7, which is driven by an oil pressure motor 8. This oil pressure motor 8 is actuated by signals coming from a preset counter 9, in which are put the working specifications of the plate breadth being transformed to signals by a prescribing apparatus or control 10.

On the take-out side of the material plate relative to the rolling rollers 1a and 1b are disposed a pair of measuring rollers, a roller for measuring the plate thickness 11a and a roller for measuring the plate length 11b. The thickness and the length of the material plate passing between these rollers are measured, and the results of measurements are conveyed as signals to pulse emitters 12, which modify these informations and give modified signals to the preset counter 4.

Likewise, a pair of rollers for measuring the plate breadth 13 are placed on the left and right side of the plate. They convey the results of measurements similarly to a pulse emitter 14, which modifies these informations and gives modified signals to the preset counter 9.

Figure 5:
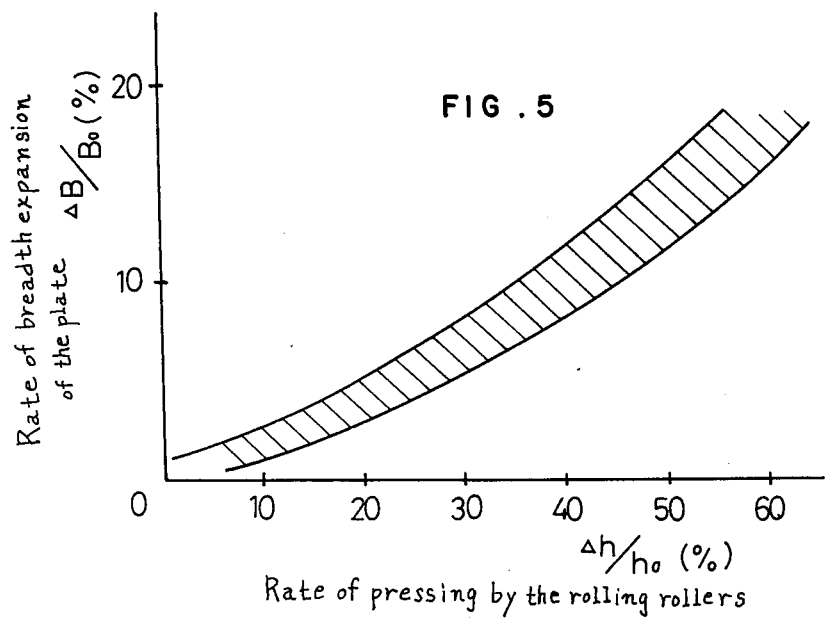
FIG. 5 is a graph indicating the relation between the breadth expansion of the plate and the extent of the pressing by the rolling rollers.
Figure 6A:
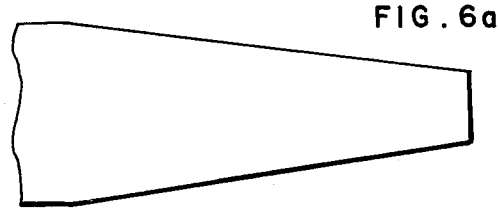
FIGS. 6(a) and (b) illustrate a spring material plate after breadth regulation by the rolling rollers, FIG. 6 (a) being a plan view and FIG. 6 (b) being a side view.
Figure 6B:
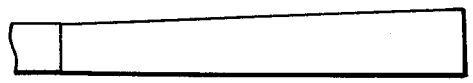

In order to determine the specifications for said prescribing apparatuses 5 and 10, the interrelations between the rates of breadth expansion of the plate and the rates of pressing by the rolling rollers must beforehand be experimentally ascertained and the numerical values must be established. The results of such experiments are indicated in FIG. 5. Here, $\Delta h$ denotes $h_0-h_1$, $h_0$ and $h_1$ being designated in FIG. 2, and $\Delta B$ denotes $B_0-B_1$, $B_0$ and $B_1$ being designated in FIG. 3. Numeral 15 in FIG. 2 is a brush for removing scales.

Figure 7A:
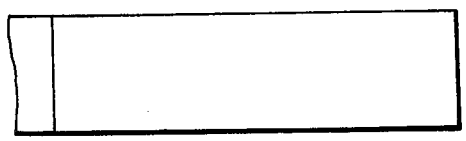
FIGS. 7(a) and (b) illustrate the final shapes of a finished taper leaf spring after taper rolling, FIG. 7 (a) being a plan view and FIG. 7 (b) being a side view.
Figure 7B:
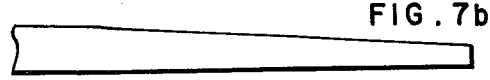
Figure 8A:
FIGS. 8(a) to (i) show the cross sections of the terminals of taper leaf springs in various other embodiments.
Figure 8B:
Figure 8C:
Figure 8D:
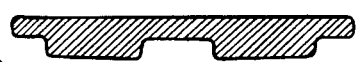
Figure 8E:
Figure 8F:
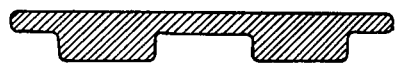
Figure 8G:
Figure 8H:
Figure 8I:

With such a pressing and rolling formula, the material plate is first pressed and rolled in respect of the breadth direction by means of the edge rollers 6 so as to have a cross section, for example, as shown in FIG. 3 (b). If, at this time, it is so regulated that the narrowing of the breadth should be great in the beginning and become gradually smaller later, the plate is made to have a shape as seen in the plan view of FIG. 6 (a). The plate shaped in such a way is further pressed down in the direction of thickness by means of the rolling rollers 1a and 1b. If, at this time, too, it is so adjusted that the pressing should be large in the beginning and become gradually smaller later, taper rolling as shown in FIG. 7(b) can be achieved. These results are perceived by the measuring rollers 11a, 11b and 13 respectively, and if these results do not agree with the predetermined specifications, modified signals are put in the preset counters 4 and 9.

If the shapes of the edge rollers 6 and the rolling rollers 1a and 1b are specified, taper leaf springs having cross sections as seen in FIG. 8 (a) through (i) can be formed.

What is claimed is:

1. A process of manufacturing a taper leaf spring from a material plate, the process using a pair of rolling rollers positioned downstream of a pair of edge rollers and comprising:
    positioning a pair of plate thickness and length measuring rollers, and a pair of plate breadth measuring rollers downstream of the rolling rollers;
    passing the material plate through the edge and rolling rollers;
    measuring and transmitting, via pulse transmitters, signals representative of plate thickness and plate length of the material plate after rolling;
    comparing transmitted signals with predetermined values to determine a first correction signal;
    applying the first correction signal to means controlling spacing between the rolling rollers;
    measuring and transmitting, via a pulse transmitter, a signal representative of plate breadth after rolling;
    comparing the transmitted signal with a predetermined value to determine a second correction signal; and
    applying the second correction signal to means controlling spacing between the edge rollers so that said edge and said rolling rollers, when adjusted, roll the material plate in a single pass.

2. A device for manufacturing a taper leaf spring comprising a pair of upper and lower rolling rollers for pressing and rolling a material plate for a taper leaf spring, rollers for measuring the length and the thickness of the plate disposed on the take-out side of the plate relative to said pair of rolling rollers, rollers for measuring the breadth disposed on the same take-out side, a pair of right and left edge rollers mounted on the take-in side of the plate into said rolling rollers, first means for controlling the spacing between said rolling rollers, said first means including means for measuring and transmitting signals representative of the length and thickness of a rolled plate, and means for comparing the transmitted signals with predetermined values and for generating a correction signal, and second means for controlling the spacing between said edge rollers, said second means including means for measuring and transmitting a signal representative of the breadth of a rolled plate, and means for comparing the transmitted signal with a predetermined value and for generating a correction signal.

3. A device for manufacturing a taper leaf spring according to claim 2, wherein the edge rollers are provided with a shape of concave portion between a pair of flange portions, the shape of the edge rollers in an axial direction being a continuous concave of one radius.

4. A deivce for manufacturing a taper leaf spring according to claim 2, wherein the edge rollers are provided with a shape of concave portion between a pair of flange portions, the shape of the edge rollers in an axial direction being a continuous concave of more than two different radii of curve.

* * * * *